(12) United States Patent
Wilder (10) Patent No.: US 12,340,713 B1
(45) Date of Patent: Jun. 24, 2025

(54) FLIGHT TRAINING DEVICE

(71) Applicant: Epoch Flight Systems LLC, Frisco, TX (US)

(72) Inventor: Bruce Gary Wilder, Frisco, TX (US)

(73) Assignee: Epoch Flight Systems LLC, Frisco, TX (US)

( * ) Notice: Subject to any disclaimer, the term of this patent is extended or adjusted under 35 U.S.C. 154(b) by 0 days.

(21) Appl. No.: 18/945,101

(22) Filed: Nov. 12, 2024

(51) Int. Cl.
  *G09B 9/08* (2006.01)
  *G09B 9/24* (2006.01)

(52) U.S. Cl.
  CPC ............... *G09B 9/24* (2013.01); *G09B 9/085* (2013.01)

(58) Field of Classification Search
  None
  See application file for complete search history.

(56) References Cited

U.S. PATENT DOCUMENTS

| | | |
|---|---|---|
| 2,996,242 A | 8/1961 | Bannister |
| 3,721,007 A | 3/1973 | Banner |
| 3,876,866 A | 4/1975 | Kaspar |
| 5,214,855 A * | 6/1993 | Gibbs ............... G01C 21/20 235/78 N |

OTHER PUBLICATIONS

ASA; "ASA Holding Pattern Computer With Standard and Non-Standard Holding Pattern for Aviation"; Feb. 2016; 13 pages.
Office Action dated Mar. 28, 2025; U.S. Appl. No. 19/025,644, filed Jan. 16, 2025; 20 pages.

* cited by examiner

*Primary Examiner* — James B Hull
(74) *Attorney, Agent, or Firm* — Conley Rose, P.C.; Grant Rodolph; Robert E. Kent (57) ABSTRACT

In some examples, a navigation training device includes a base having an aperture through a center point of the base. The base includes a plurality of first markings equidistantly spaced along an outer edge of the base. The navigation training device also includes a first layer having an aperture through a center point of the first layer. The first layer includes a plurality of second markings including a directional marking and section markings visually dividing a top surface of the first layer into three sections. The navigation training device also includes a connecting pin passing through the apertures of the base and the first layer.

16 Claims, 8 Drawing Sheets

FLIGHT TRAINING DEVICE

BACKGROUND

One of the most difficult problems for new aircraft pilots to learn while in instrument training is how to properly execute a holding pattern. Many variables may go into defining a holding pattern, creating challenges for new aircraft pilots to learn proper holding pattern procedures. Determining the proper holding pattern can be particularly challenging when the pilot is already flying and holding instructions are given by air traffic control (ATC).

SUMMARY

In some examples, a navigation training device includes a base having an aperture through a center point of the base. The navigation training device also includes a first layer having an aperture through a center point of the first layer. The first layer includes a plurality of first markings equidistantly spaced along an outer edge of the first layer. The navigation training device also includes a second layer having an aperture through a center point of the second layer. The second layer comprising second markings representative of a right turn aircraft holding pattern and a left turn aircraft holding pattern. The navigation training device also includes a third layer comprising a semicircle having an aperture located at a center point of an edge of the semicircle that defines a diameter of the semicircle. The navigation training device also includes a directional indicator having an aperture at an end of the directional indicator. The navigation training device also includes a connecting pin passing through the apertures of the base, first layer, second layer, third layer, and directional indicator.

In some examples, a navigation training device includes a base having an aperture through a center point of the base. The base includes a plurality of first markings equidistantly spaced along an outer edge of the base. The navigation training device also includes a first layer having an aperture through a center point of the first layer. The first layer includes a plurality of second markings including a directional marking and section markings visually dividing a top surface of the first layer into three sections. The navigation training device also includes a connecting pin passing through the apertures of the base and the first layer.

In some examples, a computer program product comprises computer executable instructions stored in a non-transitory computer executable medium. The instructions are executable by a processor to cause the processor to render a visual representation of a flight training device on a display screen, receive a control input modifying a position of a component of the flight training device, the control input related to a heading of an aircraft with respect to an aircraft holding fix, and modify the visual representation of the flight training device responsive to the control input.

DETAILED DESCRIPTION

A holding pattern is generally a racetrack-shaped flight pattern designed to hold an aircraft at a known position for some period of time. A holding pattern generally comprises an inbound leg in which the airplane is flying in a straight line toward a holding fix (or just "fix"), an outbound leg in which the airplane is flying in a straight line along an outbound course, and two generally semicircular turns between the legs (named an outbound turn and an inbound turn based on the next part of the holding pattern). The holding fix is a fixed point over the ground that is known to both ATC and the pilot, such as a Very high frequency Omnidirectional Range (VOR) station or Nondirectional Radio Beacon station (NDB), a distance measuring equipment (DME) distance along a defined VOR radial, an intersection of two VOR radials, a global positioning system (GPS) waypoint, a marker beacon, or latitude/longitude coordinates. The inbound leg is a straight-line path of flight of a specified time (e.g., 1, 1.5, or 2 minutes) or distance (e.g., 1, 1.5, or 2 nautical miles) that ends at the holding fix. The course of the outbound leg is a reciprocal (e.g., 180° different) from the inbound leg in a no-wind situation, but may be adjusted by the pilot to account for the wind so that the inbound turn smoothly concludes along the inbound leg at the appropriate time or distance from the holding fix. Pilots time the outbound leg or use another reliable metric, such as aircraft bearing to the fix, so as to know when to turn to yield a desired time or distance of the inbound leg. The inbound and outbound turns are made at a standard rate (e.g., 3° per second, or the rate of turn based on a current aircraft speed that would cause the aircraft to complete a full 360° turn in 2 minutes).

A holding pattern instruction received by a pilot of an aircraft from an air traffic controller may either be to hold as published on an instrument flight rules (IFR) enroute or approach chart, or may be specified by ATC (also called a non-charted hold). A non-charted hold will include multiple components: a holding direction (e.g., north, south, east, west, northeast, southeast, northwest, or southwest), a holding fix, an inbound leg direction (e.g., a radial, course, bearing, airway, or route on which the aircraft is to hold), a direction of turns to be made in the hold (e.g., right or left), a time or length of the inbound leg, and a time at which the pilot may expect further ATC clearance.

As the aircraft passes over the holding fix, the pilot begins an outbound turn by banking the aircraft to a bank angle, for example, the bank angle required to produce a standard rate turn. As the aircraft approaches a specified outbound heading, the pilot levels the aircraft and flies on that heading for an outbound leg duration, which may be the same as the inbound leg duration or may vary from the inbound leg duration, such as to compensate for the effects of wind or other external factors. The pilot then banks the aircraft to the same bank angle as before, beginning the inbound turn and continues that turn until the aircraft reaches the start of the inbound leg. The pilot then levels the wings and uses a defined wind corrected heading to fly the inbound course to the fix and repeats the entire process, until given instructions to proceed from the hold.

An additional complexity in flying holding patterns is determining an entry procedure for the holding pattern. For example, holding pattern entries may include a direct entry, a parallel entry, or a teardrop entry. Each entry procedure may be more suited than another of the entry procedures based on the direction the airplane is approaching the holding fix.

Thus, in learning and practicing holding pattern procedures, a pilot may need to visualize multiple flight criteria. This may be a challenge, particularly for new pilots who lack experience in holding pattern procedures and may have limited flight time in holding patterns.

Disclosed herein are examples that enhance flight training, and particularly with respect to holding pattern flight procedures. In some examples, an apparatus is provided. The apparatus comprises a training aid to enable an individual to visualize at least some pertinent criteria for flying a holding pattern. For example, the apparatus may include multiple layers, at least some of which having a common point of rotation. By rotating the layers, a holding pattern may be visualized. In an example, the apparatus includes a base layer, a first circular layer having equidistant radial markings in a range of 0 to 360 so as to indicate a measurement of degrees of a compass on the circular layer, a second circular layer comprising markings defining substantially oval patterns corresponding to left turn and right turn holding patterns, a semicircle layer for obscuring one of the left turn or right turn markings, a pointer (e.g., arrow), an arm, and a replica aircraft movable along a length of the arm and rotatable on the arm. In another example, the apparatus includes a base layer, a first circular layer having equidistant markings in a range of so as to indicate a measurement of degrees of a compass on the circular layer, and a second circular layer comprising a first marking indicating a direction (e.g., such as an arrow) and second markings dividing the second circular layer into a plurality of regions (such as three regions) relative to the first marking. While aspects of this description are generally described in the context of flight training or flight navigation, teachings of this description may also be adapted to be applicable to other forms of navigation, such as terrestrial, water, or the like.

In some examples, the apparatus may be manufactured via additive manufacturing processes, such as three-dimensional (3D) printing. As such, the apparatus may comprise any material suitable for 3D printing, such as plastics, metals, or combinations thereof. In other examples, the apparatus may be manufactured via subtractive manufacturing, such as laser cutting, waterjet cutting, routing, a computer numerical control (CNC) process, or the like. In yet other examples, the apparatus is formed by injecting, pressing, or otherwise imprinting material using a mold, carving, or any other suitable process. In some examples, the apparatus is fabricated in multiple pieces that are assembled after completion of the fabrication. In other examples, the apparatus is fabricated in such a manner as to cause the apparatus to be assembled at a completion of the fabrication process.

In some examples, the apparatus is represented in a digital environment. For example, the apparatus may be represented in two-dimensional (2D) or 3D form on a computing device, such as a tablet, a smartphone, a laptop computer, a television, a wearable device, an augmented or virtual reality device, or the like. In such examples, the apparatus may be formed according to computer executable instructions stored in a non-transitory memory and executed by the computing device to render the representation of the apparatus on the computing device.

Figure 1:
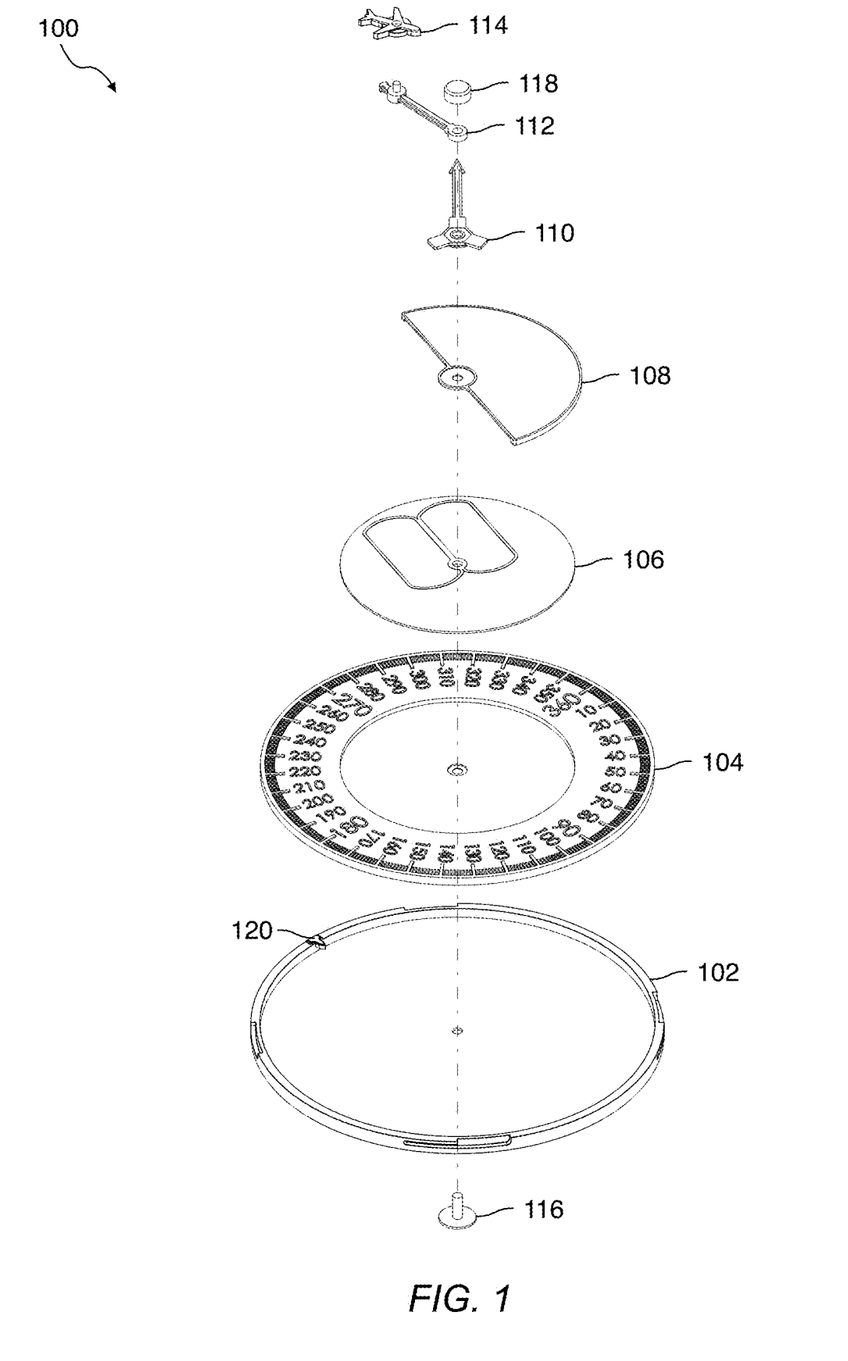
FIG. 1 is an exploded view of an example flight training device.
Figure 2:
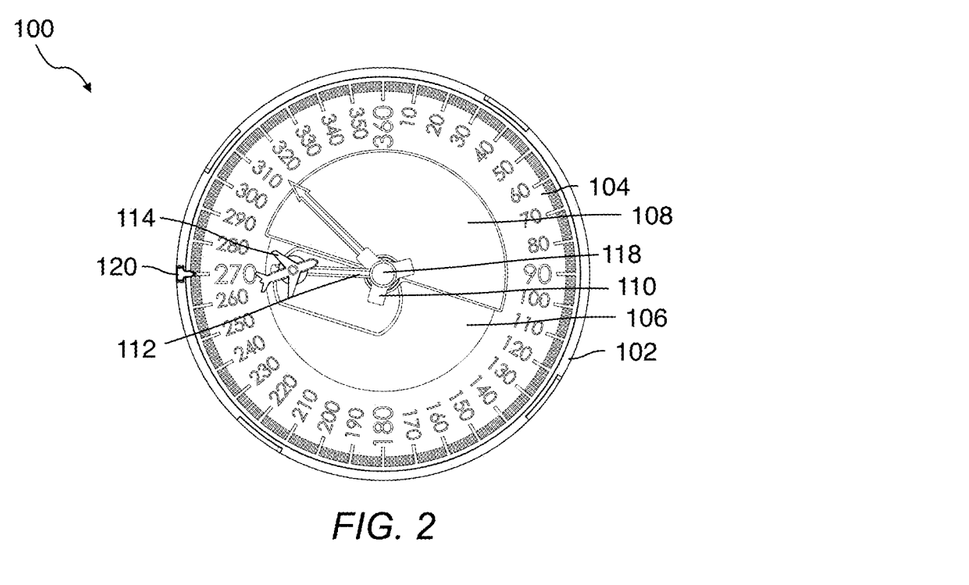
FIG. 2 is a top-down view of the example flight training device.

FIG. 1 is an exploded view of an example flight training device 100. FIG. 2 is a corresponding top-down view of the flight training device 100. In an example, the flight training device 100 includes a base 102, a first layer 104, a second layer 106, a third layer 108, a directional indicator 110, an arm 112, an aircraft replica 114, a connecting pin 116, and a connecting cap 118. In an example, the base 102, the first layer 104, the second layer 106, the third layer 108, the directional indicator 110, and the arm 112 each include an aperture of sufficient diameter to allow the connecting pin 116 to pass through the aperture. The connecting pin 116 may engage with the connecting cap 118, such as via a press fit, to maintain the flight training device 100 in an assembled state. As a result, with the flight training device 100 in the assembled state, the base 102, the first layer 104, the second layer 106, the third layer 108, the directional indicator 110, and the arm 112 may rotate about the connecting pin 116.

The base 102 may be substantially circular in shape. In an example, the base 102 includes a recessed portion into which the first layer 104 fits. In other examples, the base 102 does not include the recessed portion. The base 102 may further include an indicator 120, such as an arrow. In an example of the base 102 which includes the recessed portion, the indicator 120 may extend into and above the recessed portion such that the indicator 120 overlays at least a portion of the first layer 104 with the flight training device 100 in the assembled state. In this way, the indicator 120 may indicate a position or location along the first layer 104. In an example, the indicator 120 may be useful for indicating a wind direction.

The first layer 104 may be substantially circular in shape. In some examples, the first layer 104 has a diameter less than a diameter of the base 102. The first layer 104 includes markings around a top surface of the first layer 104, such as an outer edge of the top surface of the first layer 104, to indicate a position of the first layer 104 with respect to a reference point. The reference point may be the indicator 120. In some examples, the markings are equidistantly spaced in a circle such that the markings are representative of circular degrees. For example, approximately thirty-six equidistantly spaced markings such as lines, hash marks, or the like may be included, with each marking being representative of a ten-degree increment. In other examples, approximately 360 equidistantly spaced markings may be included, with each marking being representative of a one-degree increment. In still other examples, any suitable number of equidistantly spaced markings may be included, with each marking being representative of an X-degree increment. In this way, the markings may be representative of a bearing or heading useful in navigating an aircraft. In some examples, the markings may also include numerals corresponding to at least some of the lines or hash marks. The markings may be formed in the material of the first layer 104, or may be added to the first layer 104, such as via paint, adhesive labels, laser engraving, or any other suitable marking process. In an example, the first layer 104 includes a recessed portion into which the second layer 106 fits. In other examples, the first layer 104 does not include the recessed portion.

The second layer 106 may be substantially circular in shape. In some examples, the second layer 106 has a diameter less than a diameter of the first layer 104. The second layer 106 includes markings on a top surface of the second layer 106. In an example, the markings correspond to a general shape of right turn and left turn holding patterns. The markings may be formed in the material of the second layer 106, or may be added to the second layer 106, such as via paint, adhesive labels, laser engraving, or any other suitable marking process.

The third layer 108 may be substantially semi-circular in shape. In some examples, the third layer 108 has a diameter less than the diameter of the first layer 104 but greater than the diameter of the second layer 106. In an example, the third layer 108 includes a recessed portion into which the second layer 106 fits on an underside of the third layer 108. In other examples, the third layer 108 does not include the recessed portion, such that the third layer 108 rests on the top surface of the second layer 106. In some examples, the third layer 108 has a diameter substantially equal to the diameter of the second layer 106. The third layer 108 may be rotatable about the connecting pin 116 to obscure the right turn holding pattern markings or the left turn holding pattern markings of the second layer 106 from view. For example, the third layer 108 may have a size and shape such that approximately a half of the second layer 106 including the holding pattern markings to be obscured (e.g., right turn or left turn) may be overlaid by the third layer 108, thereby obscuring the overlaid holding pattern markings.

In an example, the directional indicator 110 is rotatable about the connecting pin 116, such as to point toward or otherwise indicate a position on the first layer 104. For example, the directional indicator 110 may be rotatable about the connecting pin 116 to enable the directional indicator 110 to be directed toward one of the markings on the top surface of the first layer 104. As such, in some examples, the directional indicator 110 has a length less than a diameter of the first layer 104. In some examples, the length of the directional indicator 110 is greater than or equal to the diameter of the second layer 106 and/or the third layer 108. In an example, the directional indicator 110 is representative of a course of an aircraft from a fix (e.g., represented by the center point of the base 102, such as represented by the connecting pin 116).

In an example, the arm 112 is rotatable about the connecting pin 116. In some examples, the arm 112 has a length less than a diameter of the first layer 104. In some examples, the length of the arm 112 is greater than or equal to the diameter of the second layer 106 and/or the third layer 108. In an example, the length of the arm 112 is approximately equal to the length of the directional indicator 110. The arm 112 also includes a sliding platform that is slidable along at least a portion of the length of the arm 112. The sliding platform may include a connecting component, such as a pin, a hole, or the like. The aircraft replica 114 may be attachable to the arm 112 via the connecting component of the sliding platform. For example, the sliding platform may include a pin, post, or other component which may be inserted into a corresponding aperture of the aircraft replica 114. Accordingly, in some examples, the aircraft replica 114 may be rotatable about the connecting component of the sliding platform of the arm 112.

In an example of operation of the flight training device 100, the first layer 104 may be rotated to cause the indicator 120 to become aligned with a marking of the first layer 104. For example, for holding pattern training, the first layer 104 may be rotated to cause the indicator 120 to become aligned with a marking of the first layer 104 that corresponds to a wind direction of hypothetical or real flight conditions. Next, the aircraft replica 114 may be oriented by rotating the arm 112 about the connecting pin 116 and/or rotating the aircraft replica 114 on the arm 112 to represent an aircraft heading. The second layer 106 may be rotated to cause a centerline dividing the right turn and left turn marking of the second layer 106 with a holding radial (e.g., a marking on the surface of the first layer 104). The third layer 108 may be rotated to obscure a holding pattern not in use (e.g., the right turn or the left turn holding pattern markings). The directional indicator 110 may be rotated to cause the directional indicator 110 to become aligned with a marking of the first layer 104 that corresponds to an inbound heading or course for intersecting a fix of the holding pattern. Finally, the aircraft replica 114 may be moved by moving the aircraft replica 114 with respect to the arm 112 and the arm 112 with respect to a remainder of the flight training device 100 to cause the aircraft replica 114 to move along the holding pattern illustrated by the second layer 106. In some embodiments, the second layer 106 may contain segmented markings or colors that correspond to the inbound course for the direct, parallel, and teardrop entries into the holding pattern.

Figure 3:
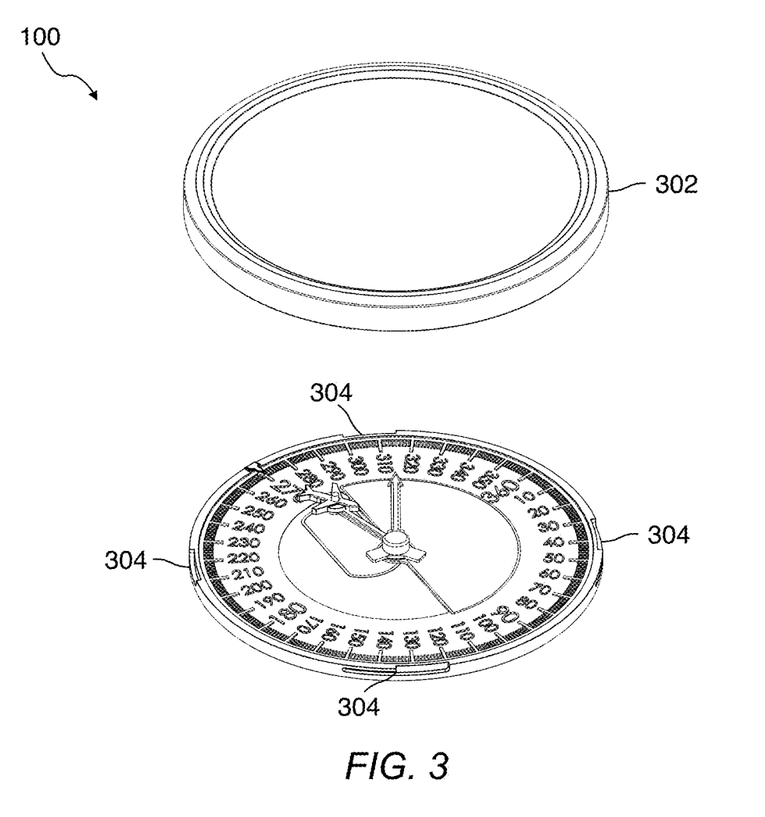
FIG. 3 is an exploded view of the example flight training device including a cover.

FIG. 3 is an exploded view of the example flight training device 100 including a cover 302. In an example, the cover 302 may engage with the base 102 to cover a remainder of components of the flight training device 100, such as to protect the components from damage. In an example, the cover 302 interacts with the base 102, such as via slots 304, to lock to or otherwise be retained in a coupling with the base 102. In some examples, the cover 302 includes markings on an outside and/or inside surface of the cover 302, such as operating instructions for the flight training device 100, ornamental, decorative, branding, regulatory, or other informational markings, or the like. The markings may be formed in the material of the cover 302, or may be added to the cover 302, such as via paint, adhesive labels, laser engraving, or any other suitable marking process.

Figure 4:
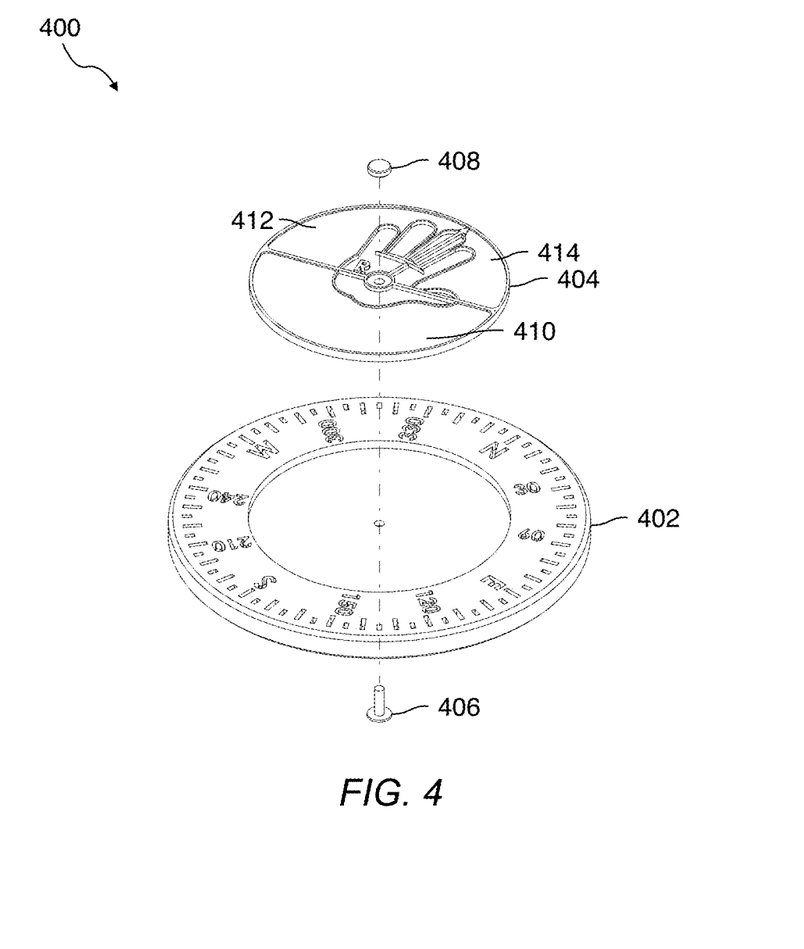
FIG. 4 is an exploded view of an example flight training device.
Figure 5:
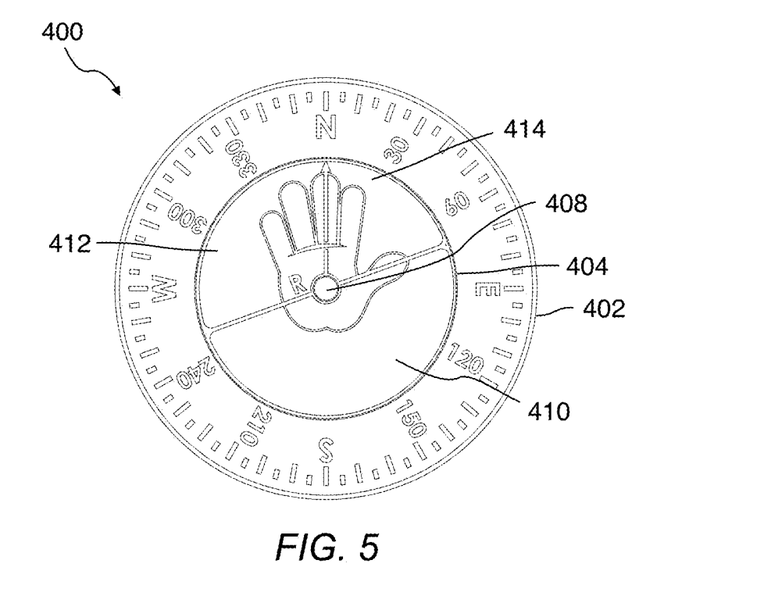
FIG. 5 is a top-down view of the example flight training device.

FIG. 4 is an exploded view of an example flight training device 400. FIG. 5 is a corresponding top-down view of the flight training device 400. In an example, the flight training device 400 includes a base 402, a first layer 404, a connecting pin 406, and a connecting cap 408. The base 402 and the first layer 404 each include an aperture of sufficient diameter to allow the connecting pin 406 to pass through the aperture. The connecting pin 406 may engage with the connecting cap 408, such as via a press fit, to maintain the flight training device 400 in an assembled state. As a result, with the flight training device 400 in the assembled state, the base 402 and the first layer 404 may rotate about the connecting pin 406.

The base 402 may be substantially circular in shape. In an example, the base 402 includes a recessed portion into which the first layer 404 fits. In other examples, the base 402 does not include the recessed portion. The base 402 includes markings around a top surface of the base 402, such as an outer edge of the top surface of the base 402. In some examples, the markings are equidistantly spaced in a circle such that the markings are representative of circular degrees. For example, approximately thirty-six equidistantly spaced markings such as lines, hash marks, or the like may be included, with each marking being representative of a ten-degree increment. In other examples, approximately seventy-two equidistantly spaced markings such as lines, hash marks, or the like may be included, with each marking being representative of a five-degree increment. In yet other examples, approximately 360 equidistantly spaced markings may be included, with each marking being representative of a one-degree increment. In still other examples, any suitable number of equidistantly spaced markings may be included, with each marking being representative of an X-degree increment. In this way, the markings may be representative of a bearing or heading useful in navigating an aircraft. In some examples, the markings may also include numerals, letters, or other indicators corresponding to at least some of the lines or hash marks. The markings may be formed in the material of the base 402, or may be added to the base 402, such as via paint, adhesive labels, laser engraving, or any other suitable marking process.

The first layer 404 may be substantially circular in shape. In some examples, the first layer 404 has a diameter less than a diameter of the base 402. The first layer 404 includes markings on a top surface of the first layer 404. In an example, the markings include a directional indicator, such as a line, arrow or the like. The markings may also include a representation of a human hand. In some examples, the directional indicator is aligned along a length of the representation of the human hand. The markings may also include division lines visually dividing the first layer 404 into multiple sections, such as three sections (e.g., sections 410, 412, 414). The markings may be formed in the material of the first layer 404, or may be added to the first layer 404, such as via paint, adhesive labels, laser engraving, or any other suitable marking process.

In an example of operation of the flight training device 400, the first layer 404 corresponds to a holding pattern with right turns. The first layer 404 may be rotated to cause the directional indicator of the first layer 404 to become aligned with a marking of the base 402. For example, for holding pattern training, the first layer 404 may be rotated to cause the directional indicator of the first layer 404 to become aligned with a marking of the base 402 that corresponds to an aircraft heading of a hypothetical or real aircraft. By identifying which of the sections 410, 412, 414 is adjacent to a marking of the base 402 corresponding to outbound heading of a hypothetical or real holding pattern, an entry procedure for entering the holding pattern may be identified. For example, for an outbound heading indicated by a marking of the base 402 adjacent to the section 410, the holding pattern entry may be a direct entry. Similarly, for an outbound heading indicated by a marking of the base 402 adjacent to the section 412, the holding pattern entry may be a parallel entry. Further, for an outbound heading indicated by a marking of the base 402 adjacent to the section 414, the holding pattern entry may be a teardrop entry.

Figure 6:
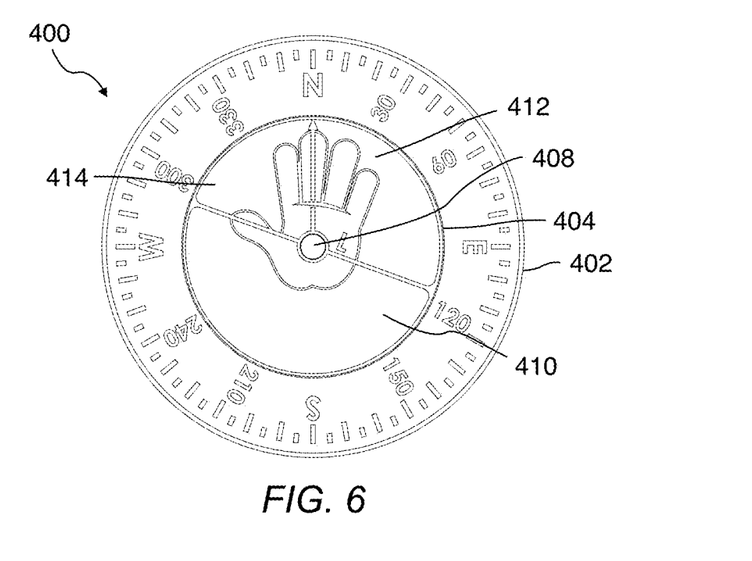
FIG. 6 is a top-down view of the example flight training device.

As shown in FIG. 6, the first layer 404 may instead correspond to a holding pattern with left turns. In such an example, for an outbound heading indicated by a marking of the base 402 adjacent to the section 410, the holding pattern entry may be a direct entry. Similarly, for an outbound heading indicated by a marking of the base 402 adjacent to the section 412, the holding pattern entry may be a parallel entry. Further, for an outbound heading indicated by a marking of the base 402 adjacent to the section 414, the holding pattern entry may be a teardrop entry.

Figure 7:
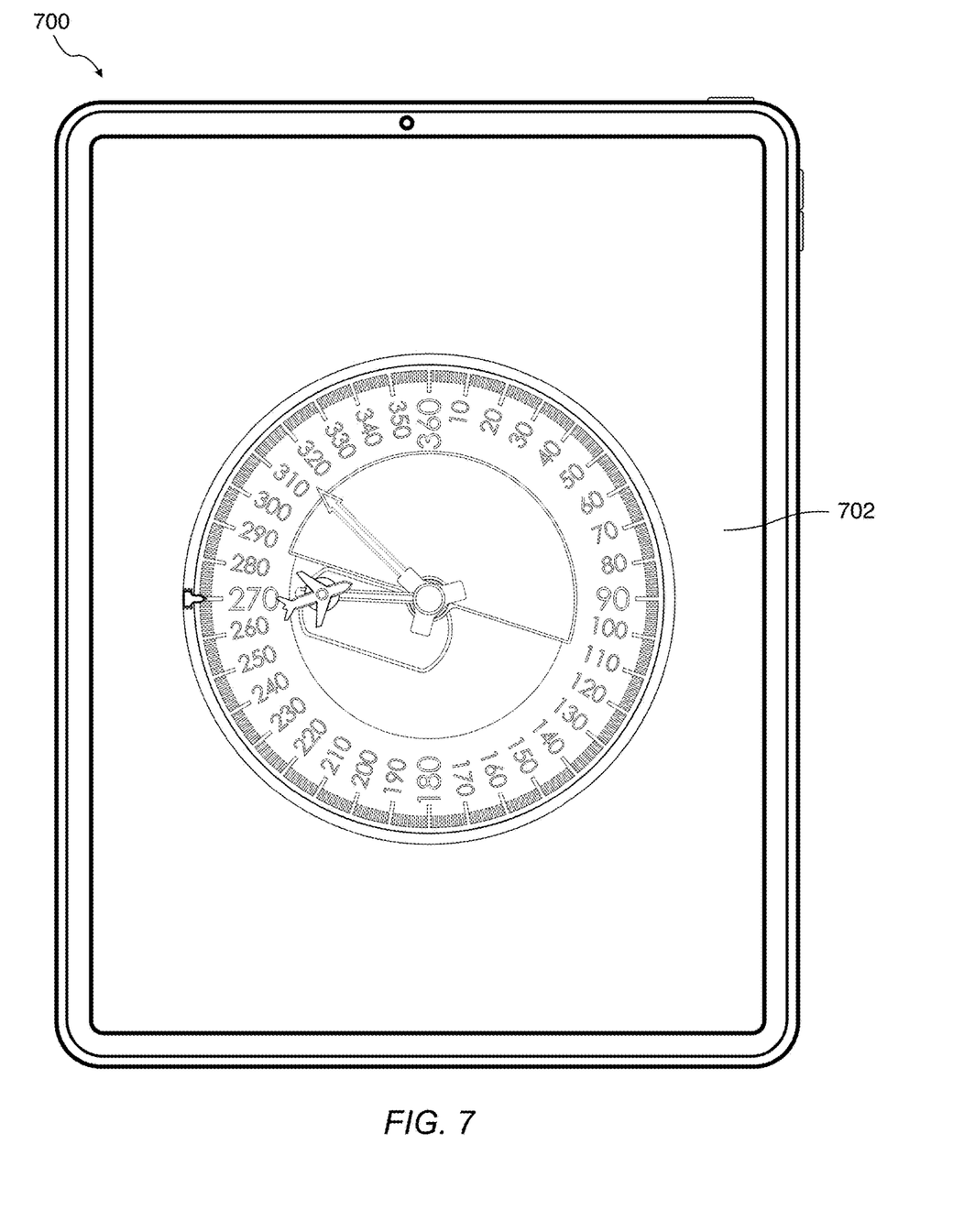
FIG. 7 depicts a computing device, which is operable for implementing aspects of this description.
Figure 8:
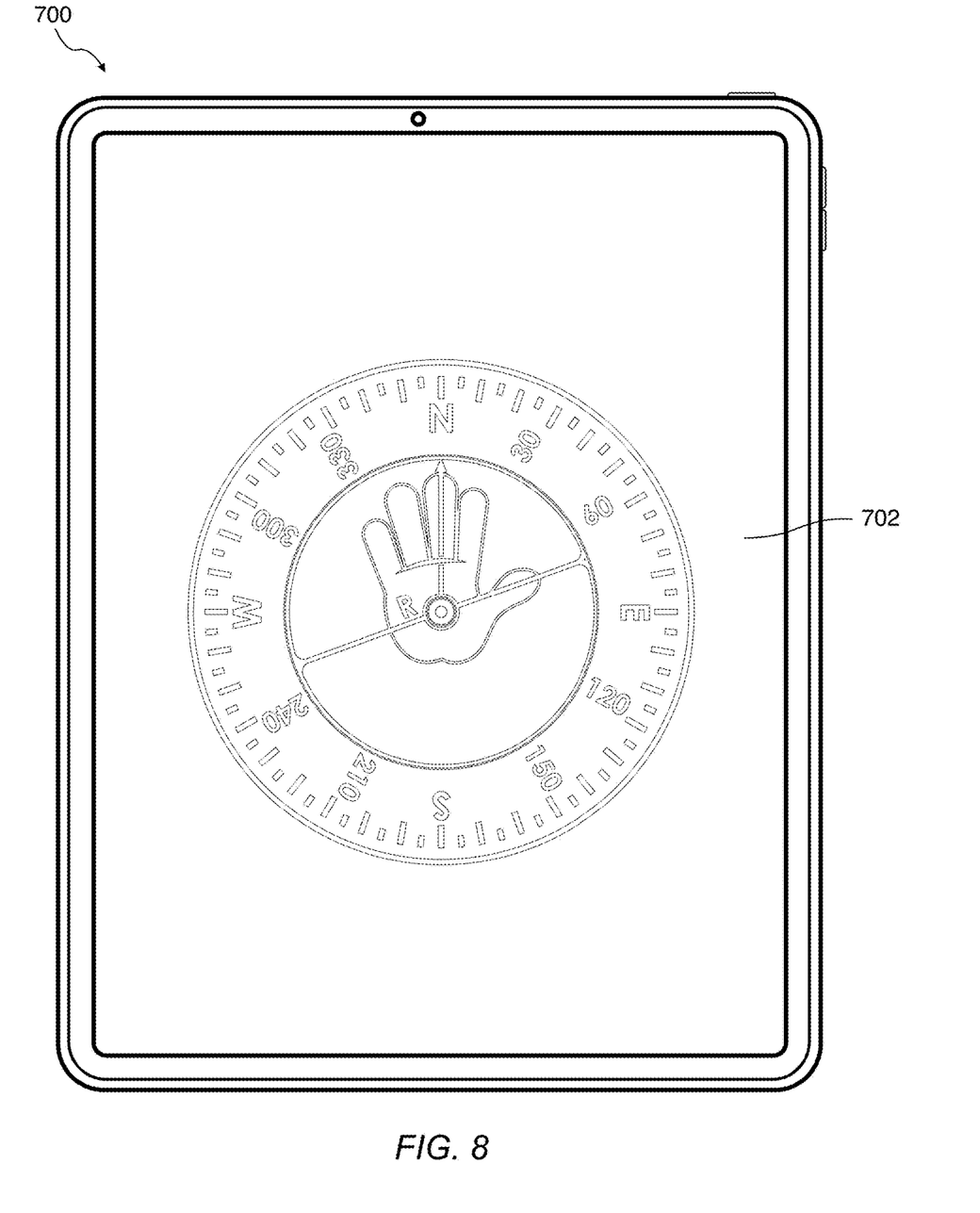
FIG. 8 depicts a computing device, which is operable for implementing aspects of this description.
Figure 9:
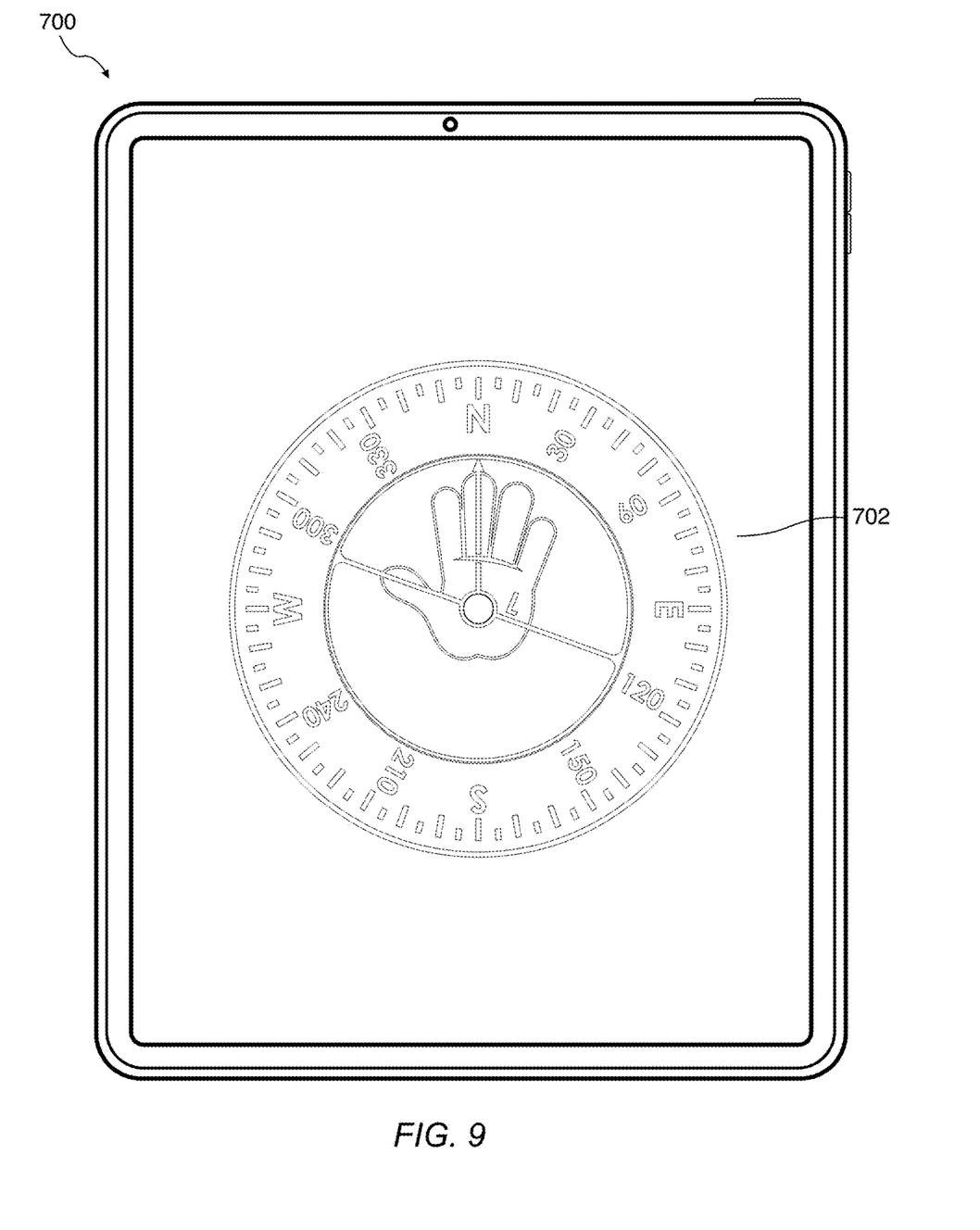
FIG. 9 depicts a computing device 700, which is operable for implementing aspects of this description.

FIG. 7 depicts a computing device 700, which is operable for implementing aspects of this description. Though illustrated as a tablet device, the computing device 700 may take various forms including a smartphone, a laptop computer, an augmented or virtual reality device, a wearable device with a screen, or the like. The computing device 700 includes a touchscreen display 702 having a touch-sensitive surface for input by a user. The computing device 700 may have other components such as electro-mechanical switches, speakers, camera lenses, microphones, input and/or output connectors, and other components as are well known in the art. The computing device 700 may present digital representations of the flight training device 100 as shown in FIG. 7, or the flight training device 400 as shown in FIGS. 8 and 9. The computing device 700 may accept data entry from the user, such as touch input or via a user input device such as a keyboard, mouse, touchpad, or camera, to control operation of the flight training device 100 and/or the flight training device 400, such as to rotate layers of the digital representation of the flight training device 100 and/or the flight training device 400. The computing device 700 may execute one or more software or firmware applications in response to user commands to cause the computing device to display the flight training device 100 and/or the flight training device 400. These applications may configure the computing device 700 to perform various customized functions in response to user interaction. The software or firmware applications may be stored as a computer program product in a non-transitory storage medium of the computing device 700, or may be accessed by the computing device 700 from another device (not shown) via wireless networking communication.

Figure 10:
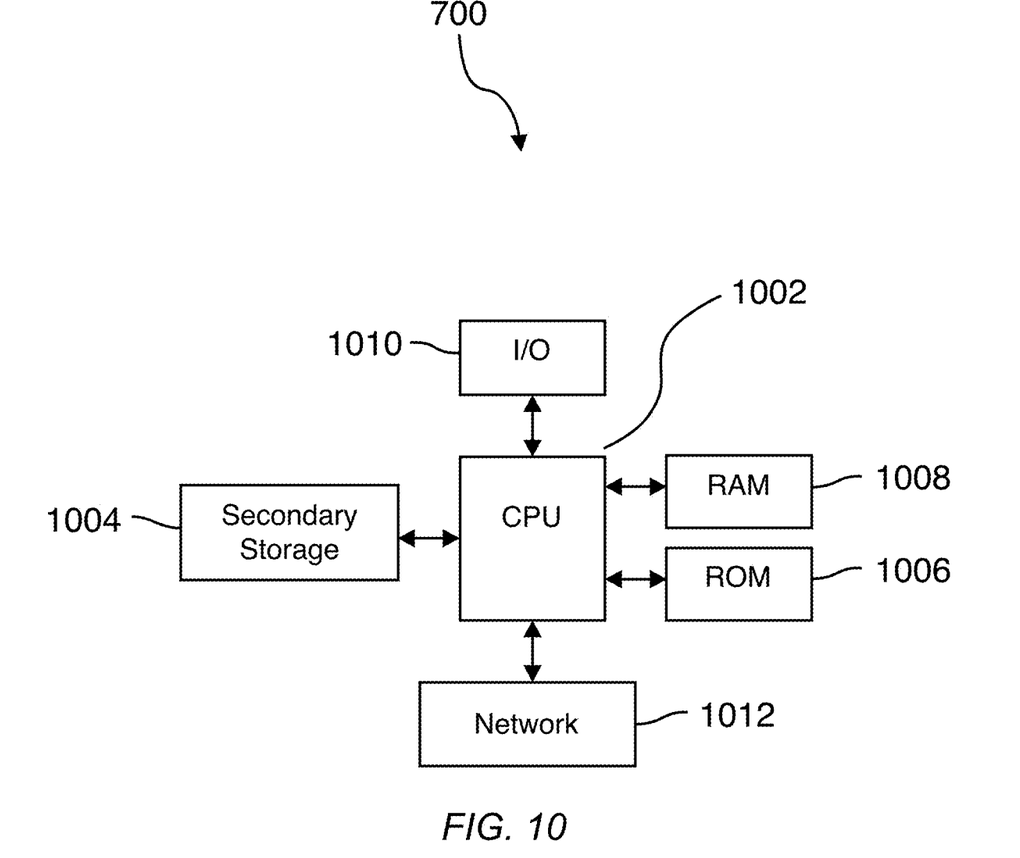
FIG. 10 is a block diagram of an example of the computer computing device suitable for implementing one or more aspects of this description.

FIG. 10 is a block diagram of an example of the computing device 700 suitable for implementing one or more aspects of this description. The computing device 700 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips.

By programming and/or loading executable instructions onto the computing device 700, at least one of the processor 1002, the RAM 1008, and the ROM 1006 are changed, transforming the computing device 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1000 is turned on or booted, the processor 1002 may execute a computer program or application. For example, the processor 1002 may execute software or firmware stored in the ROM 1006 or stored in the RAM 1008. In some cases, on boot and/or when the application is initiated, the processor 1002 may copy the application or portions of the application from the secondary storage 1004 to the RAM 1008 or to memory space within the processor 1002 itself, and the processor 1002 may then execute instructions that the application is comprised of. In some cases, the processor 1002 may copy the application or portions of the application from memory accessed via the network connectivity devices 1012 or via the I/O devices 1010 to the RAM 1008 or to memory space within the processor 1002, and the processor 1002 may then execute instructions that the application is comprised of. During execution, an application may load instructions into the processor 1002, for example load some of the instructions of the application into a cache of the processor 1002. In some contexts, an application that is executed may be said to configure the processor 1002 to do something, e.g., to configure the processor 1002 to perform the function or functions promoted by the subject application. When the processor 1002 is configured in this way by the application, the processor 1002 becomes a specific purpose computer or a specific purpose machine.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs which are loaded into RAM 1008 when such programs are selected for execution. The ROM 1006 is used to store instructions and perhaps data which are read during program execution. ROM 1006 is a non-volatile memory device which typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004. The secondary storage 1004, the RAM 1008, and/or the ROM 1006 may be referred to in some contexts as computer readable storage media and/or non-transitory computer readable media.

I/O devices 1010 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1012 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 1012 may provide wired communication links and/or wireless communication links (e.g., a first network connectivity device 1012 may provide a wired communication link and a second network connectivity device 1012 may provide a wireless communication link). Wired communication links may be provided in accordance with any suitable standard or protocol, the scope of which is not limited herein. In an embodiment, the network connectivity devices 1012 may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID), 5G, 5G New Radio, 5G LTE radio communication protocols, or the like. The network connectivity devices 1012 may enable the processor 1002 to communicate with the Internet or one or more intranets. With such a network connection, the processor 1002 may receive information from the network, or might output information to the network in the course of performing the above-described method steps.

Such information, which may include data or instructions to be executed using processor 1002 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 1002 executes instructions, codes, computer programs, scripts which it accesses from hard disk, floppy disk, optical disk (these various disk-based systems may all be considered secondary storage 1004), flash drive, ROM 1006, RAM 1008, or the network connectivity devices 1012. While only one processor 1002 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1004, for example, hard drives, floppy disks, optical disks, and/or other device, the ROM 1006, and/or the RAM 1008 may be referred to in some contexts as non-transitory instructions and/or non-transitory information.

In an embodiment, the computing device 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 700 to provide the functionality of a number of servers that is not directly bound to the number of computers in the computing device 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computing device 700, at least portions of the contents of the computer program product to the secondary storage 1004, to the ROM 1006, to the RAM 1008, and/or to other non-volatile memory and volatile memory of the computing device 700. The processor 1002 may process the executable instructions and/or data structures in part by directly accessing the computer program product, for example by reading from a CD-ROM disk inserted into a disk drive peripheral of the computing device 700. Alternatively, the processor 1002 may process the executable instructions and/or data structures by remotely accessing the computer program product, for example by downloading the executable instructions and/or data structures from a remote server through the network connectivity devices 1012. The computer program product may comprise instructions that promote the loading and/or copying of data, data structures, files, and/or executable instructions to the secondary storage 1004, to the ROM 1006, to the RAM 1008, and/or to other non-volatile memory and volatile memory of the computing device 700.

In some contexts, the secondary storage 1004, the ROM 1006, and the RAM 1008 may be referred to as a non-transitory computer readable medium or a computer readable storage media. A dynamic RAM embodiment of the RAM 1008, likewise, may be referred to as a non-transitory computer readable medium in that while the dynamic RAM receives electrical power and is operated in accordance with its design, for example during a period of time during which the computing device 700 is turned on and operational, the dynamic RAM stores information that is written to it. Similarly, the processor 1002 may comprise an internal RAM, an internal ROM, a cache memory, and/or other internal non-transitory storage blocks, sections, or components that may be referred to in some contexts as non-transitory computer readable media or computer readable storage media.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A navigation training device, comprising:
   a base having an aperture through a center point of the base;
   a first layer having an aperture through a center point of the first layer, the first layer comprising a plurality of first markings equidistantly spaced along an outer edge of the first layer;
   a second layer having an aperture through a center point of the second layer, the second layer comprising second markings representative of a right turn aircraft holding pattern and a left turn aircraft holding pattern;
   a third layer comprising a semicircle having an aperture located at a center point of an edge of the semicircle that defines a diameter of the semicircle;
   a directional indicator having an aperture at an end of the directional indicator; and
   a connecting pin passing through the apertures of the base, first layer, second layer, third layer, and directional indicator.

2. The navigation training device of claim 1, further comprising an arm having an aperture at an end of the arm, the connecting pin passing through the aperture of the arm.

3. The navigation training device of claim 2, further comprising a replica aircraft movably attached to the arm, the replica aircraft slidable along a length of the arm and rotatable about a mounting point of the replica aircraft to the arm.

4. The navigation training device of claim 1, wherein the base includes a recessed portion on a top surface of the base, the recessed portion greater in diameter than a diameter of the first layer to cause the first layer to rest within the recessed portion.

5. The navigation training device of claim 4, wherein the base includes an indicator extending into and above part of the recessed portion.

6. The navigation training device of claim 1, wherein the third layer includes a recessed portion on a bottom surface of the third layer, the recessed portion greater in diameter than the second layer to cause the second layer to fit within the recessed portion.

7. The navigation training device of claim 1, wherein the base comprises at least one locking mechanism.

8. The navigation training device of claim 7, further comprising a cover configured to engage with the locking mechanism to couple the cover to the base.

9. The navigation training device of claim 1, further comprising a connecting cover configured to engage with the connecting pin to retain the base, first layer, second layer, third layer, and directional indicator.

10. The navigation training device of claim 1, wherein the plurality of first markings indicate a measure of degrees in a range from 0 to 360.

11. The navigation training device of claim 1, wherein the plurality of first markings include indicators representative of cardinal directions.

12. A computer program product comprising computer executable instructions stored in one or more non-transitory computer executable mediums, the instructions executable by one or more processors to cause the one or more processors to render a visual representation of a flight training device on a display screen, the flight training device including:
   a base having a center point;
   a first layer having a first center point, the first layer comprising a plurality of first markings equidistantly spaced along an outer edge of the first layer;
   a second layer having a second center point, the second layer comprising second markings representative of a right turn aircraft holding pattern and a left turn aircraft holding pattern;
   a third layer comprising a semicircle having a third center point located at an edge of the semicircle that defines a diameter of the semicircle; and
   a directional indicator having a first connecting point at an end of the directional indicator,
   wherein the first, second, and third center points and the first connecting point are horizontally and vertically aligned with the center point of the base, and
   wherein the instructions are executable by the processor to further cause the processor to:
      receive a control input modifying a position of a component of the flight training device, the control input related to a heading of an aircraft with respect to an aircraft holding fix and selected as a single input from a group of inputs including:

a command to perform a rotation of the first layer about the center point of the base;

a command to perform a rotation of the second layer about the center point of the base; and a command to perform a rotation of the directional indicator about the center point of the base; and modify the visual representation of the flight training device responsive to the control input.

13. The computer program product of claim 12, wherein the flight training device further includes an arm having a second connecting point at an end of the arm, the second connecting point horizontally and vertically aligned with the center point of the base.

14. The computer program product of claim 13, wherein the group of inputs includes a command to perform a rotation of the arm about the center point of the base.

15. The computer program product of claim 13, wherein the group of inputs includes a command to translate a location of an aircraft representation along the arm.

16. The computer program product of claim 12, wherein the plurality of first markings indicate a measure of degrees in a range from 0 to 360.

\* \* \* \* \*